United States Patent
McCaslin et al.

(10) Patent No.: US 7,298,589 B2
(45) Date of Patent: Nov. 20, 2007

(54) HDD SUSPENSION AND METHOD INCLUDING CONTOURED RAIL AND PORTS

(75) Inventors: Martin John McCaslin, Pleasanton, CA (US); Arshad Alfoqaha, Eden Prairie, MN (US)

(73) Assignee: Magnecomp Corporation, Temecula, CA (US)

( * ) Notice: Subject to any disclaimer, the term of this patent is extended or adjusted under 35 U.S.C. 154(b) by 566 days.

(21) Appl. No.: 10/962,065

(22) Filed: Oct. 7, 2004

(65) Prior Publication Data
US 2005/0117256 A1    Jun. 2, 2005

Related U.S. Application Data

(60) Provisional application No. 60/510,315, filed on Oct. 8, 2003.

(51) Int. Cl.
*G11B 5/48* (2006.01)
(52) U.S. Cl. .................................. 360/244.9
(58) Field of Classification Search ............. 360/244.9
See application file for complete search history.

(56) References Cited

U.S. PATENT DOCUMENTS

| | | | | |
|---|---|---|---|---|
| 5,299,081 A * | 3/1994 | Hatch et al. | ............. | 360/244.2 |
| 5,719,727 A * | 2/1998 | Budde | ..................... | 360/244.9 |
| 5,815,348 A * | 9/1998 | Danielson et al. | ....... | 360/244.9 |
| 6,433,967 B1 * | 8/2002 | Arya | ....................... | 360/244.8 |
| 6,633,456 B1 | 10/2003 | Tsuchida | | |

* cited by examiner

*Primary Examiner*—A. J. Heinz
*Assistant Examiner*—Mark Blouin
(74) *Attorney, Agent, or Firm*—Intellectual Property Law Office of Joel D. Voelzke

(57) ABSTRACT

Techniques for reducing weight while maintaining sufficient stiffness of a suspension assembly in provided. The suspension assembly includes a surface having a proximal end and distal end. A length is defined between the proximal end and the distal end. At least one support member (such as an edge rail) is formed to provide stiffness. The support member is contoured. In a specific embodiment, a portion of at least one cutout is disposed in at least one support member, and extends from the horizontal portion of the load beam member vertically into the at least one support member.

22 Claims, 6 Drawing Sheets

HDD SUSPENSION AND METHOD INCLUDING CONTOURED RAIL AND PORTS

CROSS-REFERENCES TO RELATED APPLICATIONS

This application claims priority from U.S. provisional patent application No. 60/510,315, filed Oct. 8, 2003, entitled "HDD Suspension Employing Contoured Rail and Mass Reduction Ports," which disclosure is incorporated herein by reference.

BACKGROUND OF THE INVENTION

The present invention relates to disk drives. More particularly, the invention provides a suspension assembly having weight reduction features while maintaining sufficient stiffness, which will result in improved suspension resonance, operational shock, and flow induced windage off-track. Merely by way of example, the invention is applied to hard disk drive apparatus, but it would be recognized that the invention has a much broader range of applicability.

A hard disc drive (HDD) unit generally uses a spinning storage medium (e.g., a disk or platter) to store data. A read-write head is positioned in close proximity to the spinning storage medium by a head stack assembly (HSA). Mounted on the HSA, a suspension assembly commonly includes a base plate, a load beam, and a flexure trace gimbal to which a slider is mounted. The slider supports the read-write head element. The load beam is generally composed of an actuator mounting section, a spring region and a rigid region. The spring region gives the suspension a spring force or preload counteracting the aerodynamic lift force created by the spinning medium during reading or writing. A gimbal is mounted at the distal end of the load beam and supports the slider allowing the head to have pitch and roll movement in order to follow the irregularities of the disk surface.

Demand generally requires increased HDD storage capacity, which generally compels higher track densities. Data tracks often become narrower and the spacing between data tracks on the storage medium decreases. An obstacle associated with increased track densities is accurate positioning of the read/write head over the desired track due to turbulent air streams generated by the spinning storage medium. It is therefore desirable to produce suspension assemblies with suitable stiffness and stability.

As can be seen from the above, improved techniques for a suspension assembly are needed.

BRIEF SUMMARY OF THE INVENTION

The present invention relates to disk drives. More particularly, the invention provides a suspension assembly having weight reduction features while maintaining sufficient stiffness. Merely by way of example, the invention is applied to hard disk drive apparatus, but it would be recognized that the invention has a much broader range of applicability.

The present invention according to an embodiment provides improved rails having a contoured height. This feature enables better utilization of mass, while providing the necessary stiffness in the center of the rail length, where bending stresses are generally maximum, and a decreasing height rail toward each end, where bending stresses generally taper off. Additionally, another embodiment of the present invention provides mass reduction cutouts, thereby improving stiffness to mass ratio of a load beam. Vibrational bending stresses are typically minimal at the base (forming radius location) of a formed rail, so these cutouts occupy a space that plays a small role in contributing stiffness to the suspension. These cutouts also allow air flows induced by the spinning storage medium to pass through the suspension assembly instead of being impeded as with a conventional rail. Accordingly, flow induced windage off-track can be reduced. These cutouts can be disposed in either or both the flat portion of the load beam and into the rails.

In an embodiment of the present invention, a load beam for a suspension assembly is provided. The load beam includes a flat portion having a proximal end and distal end. A length is defined between the proximal end and the distal end. First and second support members (such as rails) are formed on opposite edges of the load beam to provide stiffness. At least one cutout is disposed in each of the first and second support members.

In another embodiment of the present invention, a load beam for a hard disk drive apparatus includes a flat portion having a proximal end and distal end. First and second support members are formed on opposite edges of the load beam to provide stiffness. The first and second support members are each contoured as a curve in a direction perpendicular to the flat portion.

In yet another embodiment of the present invention, a hard disk drive apparatus is provided. The hard disk apparatus includes a voice coil motor, an arm member, and a load beam. The arm member has a first arm end and a second arm end, the second arm end being connected to the voice coil motor. The first arm end connects to a second end of the load beam. First and second edge rails of the load beam, to increase stiffness, each have an edge contoured as a curve and at least one aperture. An aperture, which includes without limitation a cutout, can be of any arbitrary shape. The hard disk apparatus also includes a read/write head connected to a first end of the load beam via a gimbal.

Many benefits are achieved by way of the present invention over conventional techniques. For example, the present technique provides an easy to use process that relies upon conventional technology. Additionally, the present invention uses a novel technique to reduce mass and flow induced windage off-track. Depending upon the embodiment, one or more of these benefits may be achieved. These and other benefits will be described in more throughout the present specification and more particularly below.

Various additional objects, features, and advantages of the present invention can be more fully appreciated with reference to the detailed description and accompanying drawings that follow.

DETAILED DESCRIPTION OF THE INVENTION

The present invention relates to disk drives. More particularly, the invention provides a suspension assembly having weight reduction features while maintaining sufficient stiffness. Merely by way of example, the invention is applied to hard disk drive apparatus, but it would be recognized that the invention has a much broader range of applicability.

Figure 1:
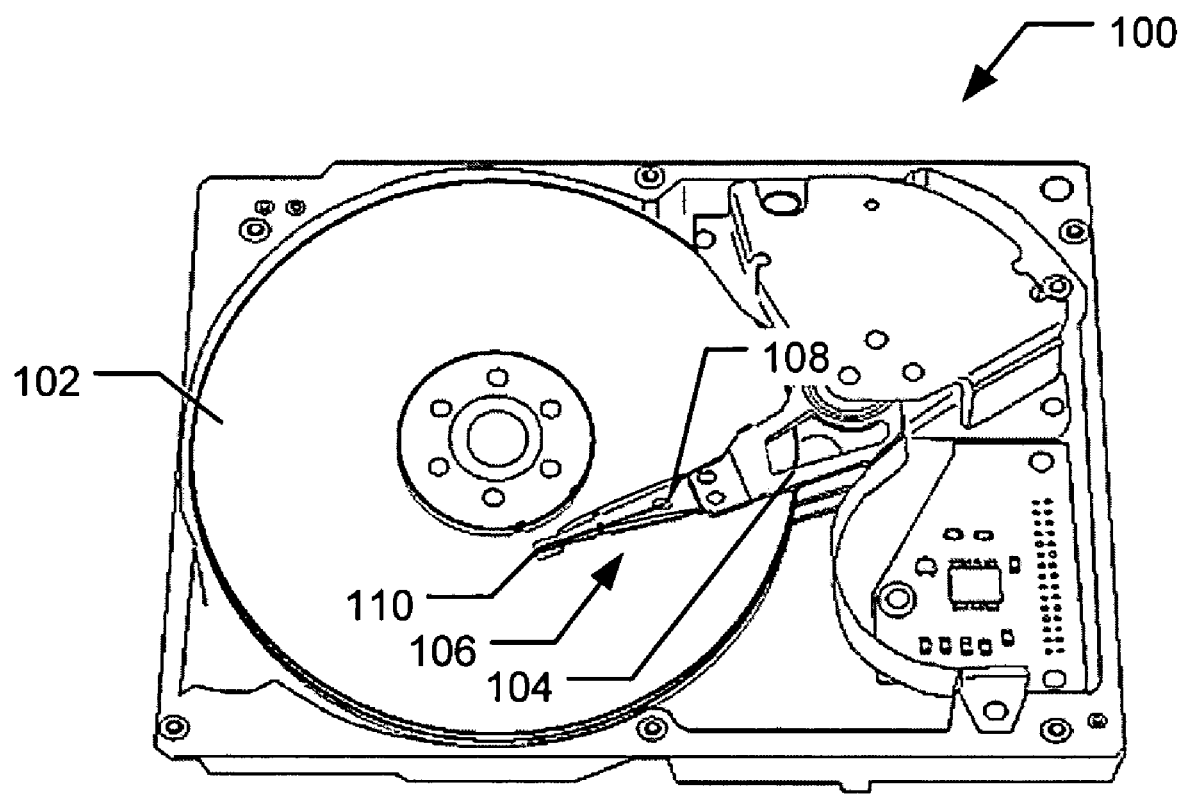
FIG. 1 shows a simplified hard disk drive apparatus according to an embodiment of the present invention.

FIG. 1 is a simplified diagram of a disk drive apparatus 100 according to an embodiment of the present invention. This diagram is merely an example, which should not unduly limit the scope of the claims herein. One of ordinary skill in the art would recognize other variations, modifications, and alternatives. Apparatus 100 includes at least one disk 102 (e.g., one, two, three, or more disks), at least one actuator arm 104 (e.g., one, two, three, or more actuator arms), and at least one suspension assembly 106 (e.g., one, two, three, or more suspension assemblies). Each suspension assembly is composed of a load beam 108, flexure trace gimbal assembly (HGA) 110, and base plate 112 (not shown). In this embodiment, load beam 108 includes contoured rails. Load beam 108 is generally a metal and, in a specific embodiment, stainless steel, although any suitable material could be employed. Base plate 112 connects the suspension assembly to an actuator arm 104. Actuator arm 104 is generally aluminum. This diagram, as well as other diagrams provided herein, is merely an example, which should not unduly limit the scope of the claims herein. One of ordinary skill in the art would recognize many other variations, modifications, and alternatives. FIG. 1, by example, depicts a desktop or server type of disk drive application, whereas a mobile disk drive may look substantially different, but would also benefit from the features of the present invention.

Disk 102, commonly called a platter, rotates about a fixed axis (or spindle) from about 3,000 rpm up to about 15,000 rpm depending upon the embodiment. Disk 102 stores information and thus often includes a magnetic medium such as a ferromagnetic material. But, it can also include optical materials, common coated on surfaces of the disk, which become active regions for storing digital bit information.

The aggregate storage capacity of disk 102 will vary with track density and disk diameter. Disk 102 stores information in tracks which can be in a range of about 50,000 tracks per inch (TPI) to about 200,000 TPI, or more. The diameter of disk 102 can be 5.12 inches (e.g., for a 5.25 inch drive), 3.74 inches (e.g., for a 3.5 inch drive), or less than 2.5 inches, or even less than 1.8 inches or 1.0 inches, or even 0.85 inches.

Suspension assembly 106, which overlies (or underlies) a surface of disk 102, operates and controls a slider coupled to a read/write head (not shown). Flexure trace gimbal assembly 110 is attached to suspension assembly 106 which is in turn is connected to actuator arm 104. Actuator arm 104 is connected to a voice coil motor or VCM, which moves suspension assembly 106 about a pivot point in an annular manner. The VCM can move at frequencies from DC up to about 1 kHz. Preferably, for higher track density, e.g., 200,000 TPI, the control bandwidth can approach 5 kHz, but can also be greater in certain embodiments.

Figure 2:
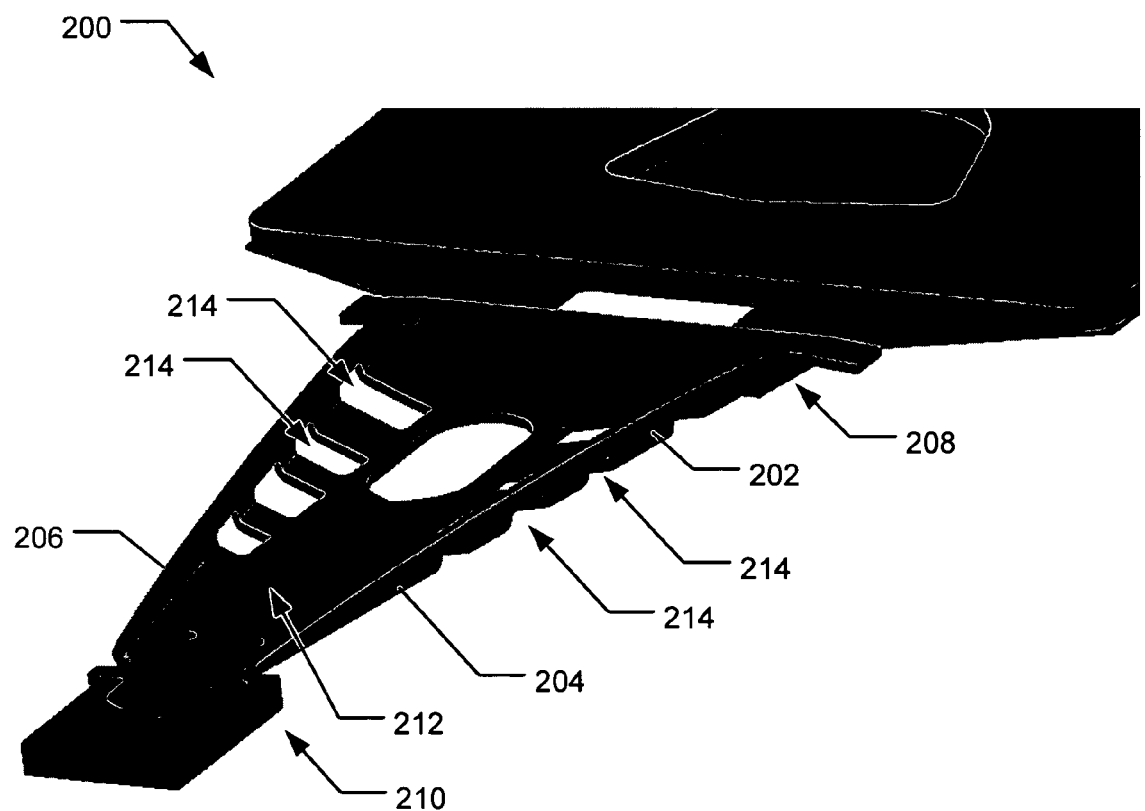
FIG. 2 shows a simplified suspension assembly according to an embodiment of the present invention.

FIG. 2 shows a simplified suspension assembly 200 according to an embodiment of the present invention. This diagram is merely an example, which should not unduly limit the scope of the claims herein. One of ordinary skill in the art would recognize other variations, modifications, and alternatives. Load beam 202 includes support members 204, 206 formed on opposite edges. Support members 204, 206 substantially extend in a longitudinal direction from a proximal portion 208 to a distal portion 210. In alternative embodiments, support members may extend along an entire length of load beam 202, or any shortened portion thereof. A length of a support member can range from about 5 mm to about 15 mm according to a specific embodiment.

A height of the support members 204, 206 from surface 212 varies. In this specific embodiment, the height is contoured as an arc or curve, or polyline, combination of radii. Shaping support members in this way reduces the mass of the support members while retaining much of the stiffness of a conventional rail. It should be noted that in other specific embodiments, support members can be contoured in any arbitrary shape (such as non-linear shapes) to reduce mass. In addition, the support members are substantially perpendicular to a flat portion of the load beam. In another specific embodiment, the support member can be angled in a range from about 70 degrees to about 85 degrees, or more, with respect to surface 212.

Referring again to FIG. 2, load beam 202 includes cutouts 214. Cutouts 214 are disposed in a portion of support members 204, 206 (or side rails), as well as portion of surface 212. Alternatively, cutouts can be disposed entirely within support members 204, 206. Cutouts 214 reduce the mass of load beam 202 for improved shock and vibration frequency performance. In addition, cutouts 214 allow air flows generated by a spinning storage medium (such as a disk or platter) to pass through load beam 202 with less obstruction, thereby reducing flow induced windage off-track. In this specific embodiment, each support member 204, 206 includes two cutouts. In alternative embodiments, a support member may have one, three, four, or more cutouts. It should be noted that each support member of a load beam need not have an equal number of cutouts. For example, a first support member can include two cutouts, while a second support member can include three cutouts. Cutouts can also be offset with respect to the length of the load beam, between support members 204 and 206. The dimensions of a cutout can vary with a specific application. In order to retain sufficient stiffness in a support member, a length of an individual cutout can range from about 0.2 mm to about 0.6 mm according to a specific embodiment. The aggregate length of all cutouts in a support member is preferably in a range of about 20% to 60% of the length of the support member according to another specific embodiment. Cutouts can be formed by mechanical milling, ion milling, laser ablating, and/or chemical etching portions of the load beam.

Figure 3:
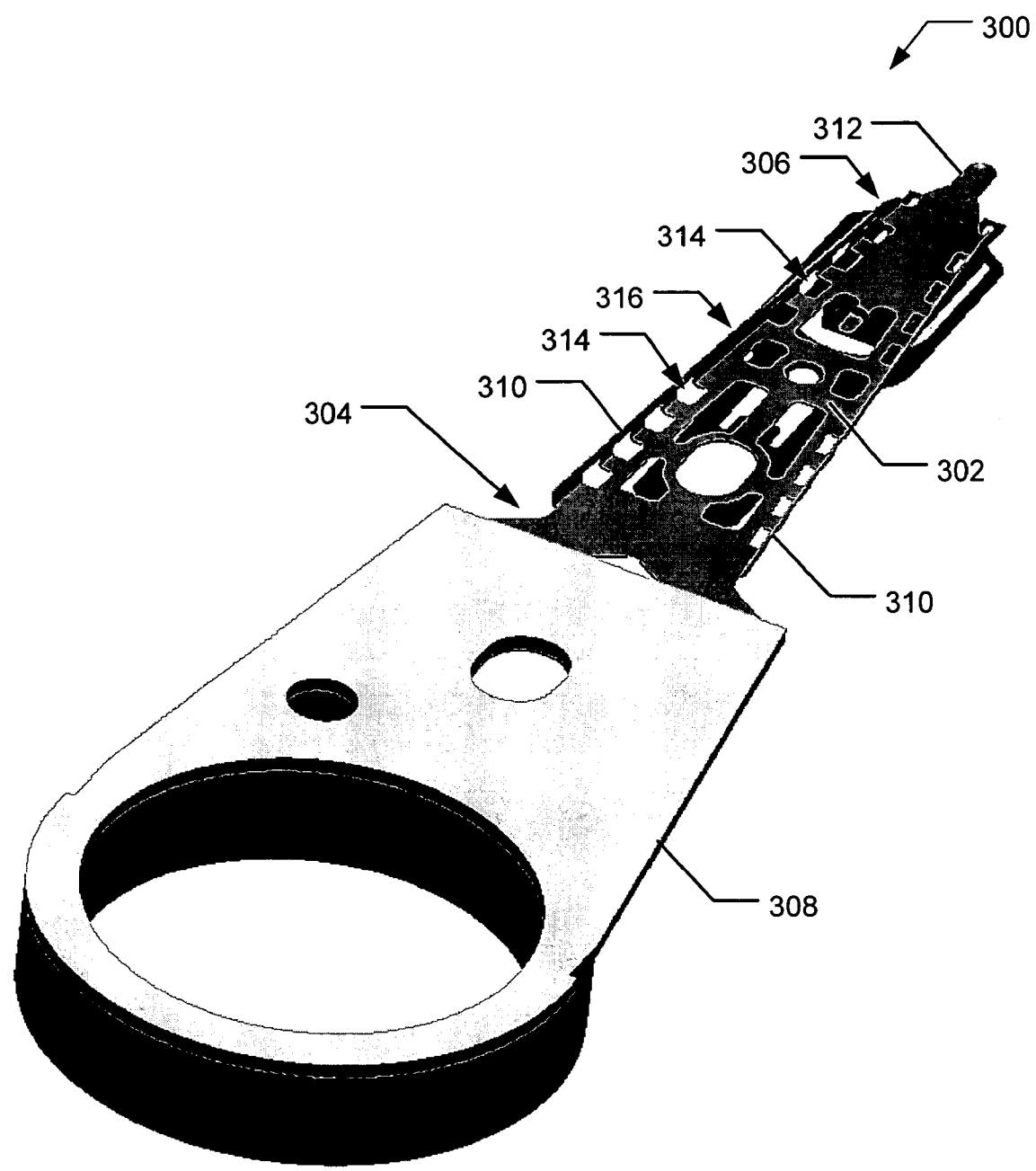
FIG. 3 shows a simplified suspension assembly according to an embodiment of the present invention.

FIG. 3 shows a simplified suspension assembly 300 according to an embodiment of the present invention. This diagram is merely an example, which should not unduly limit the scope of the claims herein. One of ordinary skill in the art would recognize other variations, modifications, and alternatives. In this specific embodiment of the present invention, load beam 302 at proximal portion 304 couples to unamount actuator arm 308. Support members 310 extend from proximal portion 304 to distal portion 306, before lift tip 312.

Support members 310 includes a plurality of cutouts 314. Cutouts 314 are disposed, at least partially, in support members 310. Each of cutouts 314 are rectangular; however, in other embodiments, cutouts can take any arbitrary shape to reduce weight of the load beam and allow air flow to pass through the load beam. The distribution of cutouts along a length of a support member need not be even. In FIG. 3, the number of cutouts are weighted to proximal portion 304. A set of seven cutouts 314 are separated by region 316 from a second set of three cutouts 314. The absence of cutouts in region 316 provides additional stiffness in region 316, where a different cutout serves a different purpose (lead edge axial limiter).

Figure 4A:
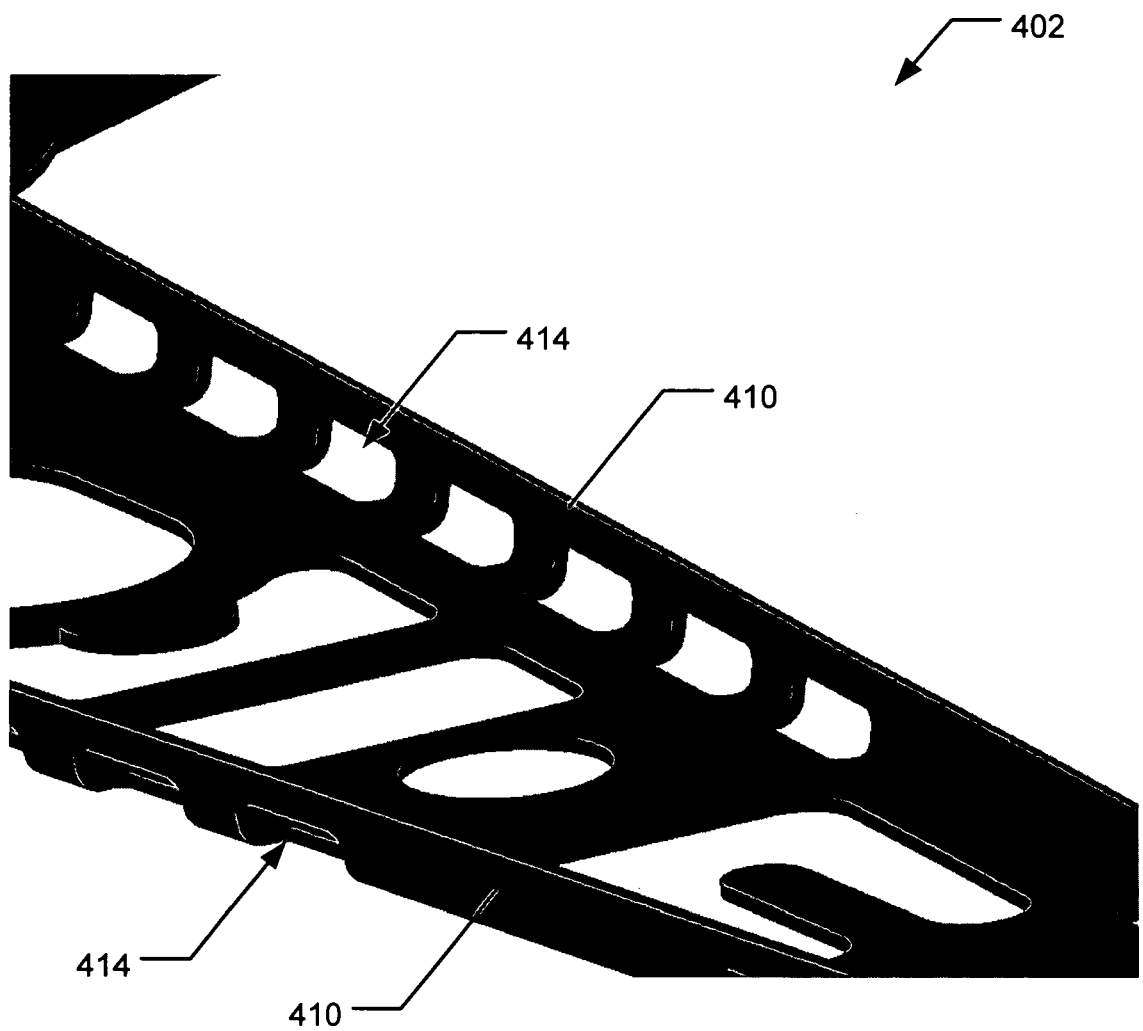
FIGS. 4A and 4B show top and bottom views of a load beam according to an embodiment of the present invention.
Figure 4B:
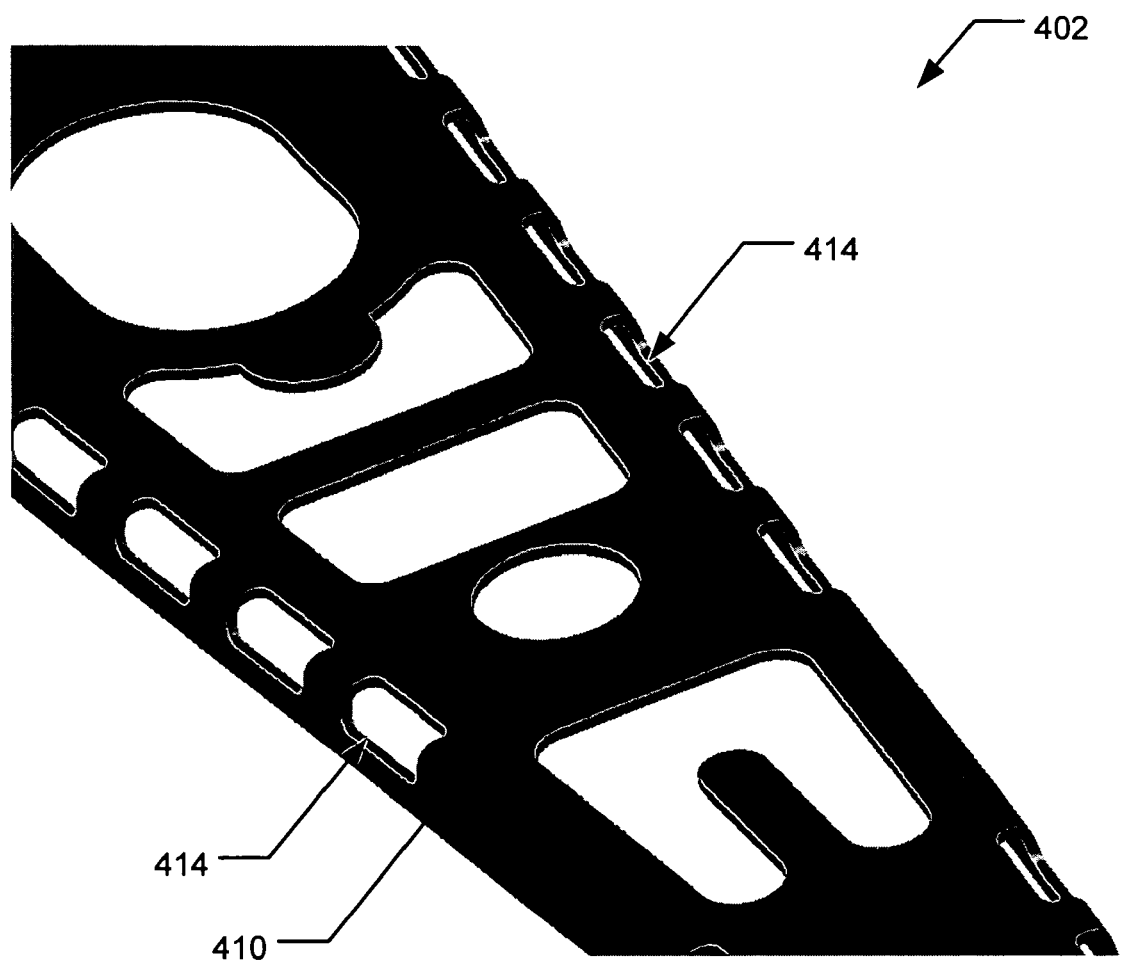

FIGS. 4A and 4B show top and bottom views of a load beam 402 according to an embodiment of the present invention. This diagram is merely an example, which should not unduly limit the scope of the claims herein. One of ordinary skill in the art would recognize other variations, modifications, and alternatives. A thin sheet of stainless steel can be used to manufacture load beam 402 having cutouts 414. This sheet can be etched by photochemical etching to form the general shape of load beam 402 (or a plurality of load beams, which are later singulated). A forming operation (and/or a bending operation) is carried out on the metal sheet to permanently set the support members 410 to near a vertical position. Other features in the load beam 402 can also be formed in this step.

Figure 5A:
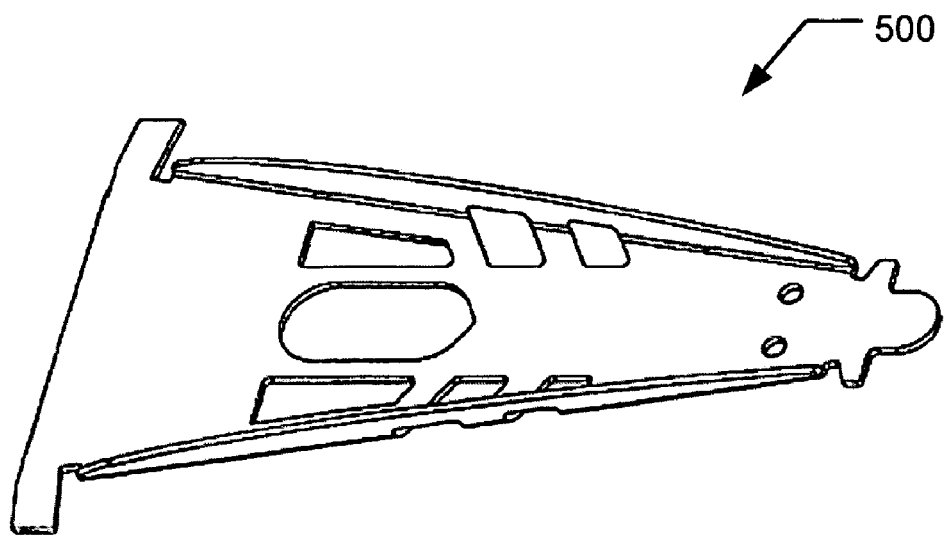
FIGS. 5A, 5B, and 5C shows views of a load beam according to an embodiment of the present invention.
Figure 5B:
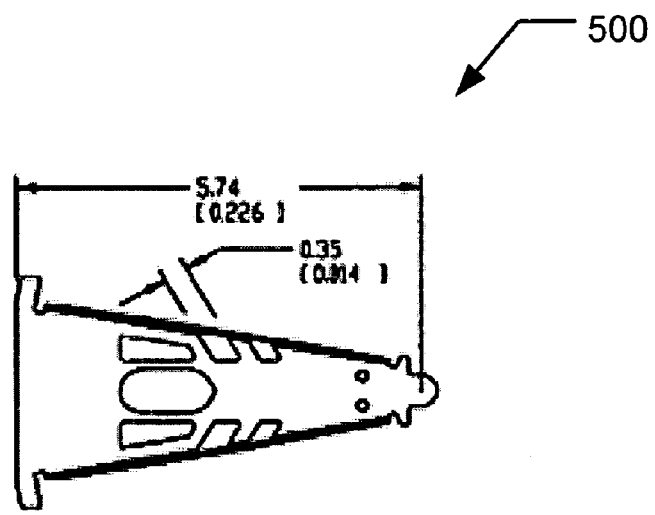
Figure 5C:
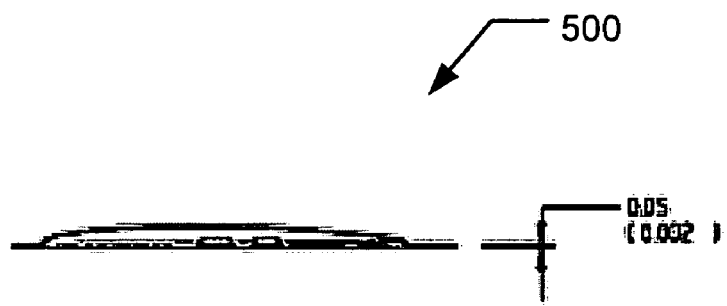

FIGS. 5A, 5B, and 5C shows views of a load beam 500 according to an embodiment of the present invention. This diagram is merely an example, which should not unduly limit the scope of the claims herein. One of ordinary skill in the art would recognize other variations, modifications, and alternatives. In this specific embodiment, cutouts disposed on the support members are slanted at an angle. Cutouts according to embodiments of the present invention may be at any arbitrary angle.

One of ordinary skill in the art would recognize many other variations, modifications, and alternatives. The above examples are merely illustrations, which should not unduly limit the scope of the claims herein. It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A hard disk drive apparatus, the apparatus comprising:
    a voice coil motor;
    an arm member having a first arm end and a second arm end, the second arm end coupled to the voice coil motor;
    a load beam having a first end and a second end, the second end coupled to the first arm end of the arm member, a length being defined between the first end and the second end;
    a support member formed in a portion of the length of the load beam to provide stiffness;
    an arched portion of the support member includes a first height disposed in a central region of the arched portion and a second height disposed in a distal region of the arched portion, the first height being different from the second height;
    a gimbal coupled to the first end; and
    a read/write head coupled to the gimbal.

2. The apparatus of claim 1 further comprising a portion of at least one aperture in the support member.

3. The apparatus of claim 2 wherein the portion of the at least one aperture in the support members rectangular.

4. The apparatus of claim 2 wherein the portion of the at least one aperture in the support member is slanted.

5. The apparatus of claim 1 further comprising a portion of at least two apertures in the support member.

6. The apparatus of claim 1 wherein the support member extends from about the first end to about the second end.

7. The apparatus of claim 1 further comprising at least a second support member formed in portions of the length of the load beam to provide stiffness.

8. The apparatus of claim 1 wherein the support member is an edge rail.

9. The apparatus of claim 1 wherein the support member is about perpendicular to a plane defined by the first and second ends of the load beam.

10. A load beam for a hard disk drive apparatus, the load beam comprising:
    a spring portion;
    a surface distal of said spring portion having a proximal end and a distal end, a length defined between the proximal end and the distal end;
    a first support member and a second support member formed on opposite edges of the load beam and distal of said spring portion to provide stiffness; and
    at least one cutout in each of the first support member and the second support member, wherein the first support member and the second support member are disposed at a predetermined angle from the surface.

11. The load beam of claim 10 wherein the predetermined angle ranges from about 60 degrees to about 90 degrees.

12. A load beam for a hard disk drive apparatus, the load beam comprising:
    a surface having a proximal end and distal end, a length defined between the proximal end and the distal end;
    a first support member and a second support member formed on opposite edges of the load beam to provide stiffness; and
    contoured edges for each of the first support member and the second support member, the contoured edges each defined by a curve having a plurality of heights;
    wherein each of the contoured edges is disposed away from the surface in a direction perpendicular to the surface.

13. A hard disk drive apparatus, the apparatus comprising:
    a voice coil motor;
    an arm member having a first arm end and a second arm end, the first arm end coupled to the voice coil motor;
    a load beam having a first end and a second end, the first end coupled to the second arm end of the arm member, and the load beam having a first edge rail and a second edge rail for stiffness,
    a contoured edge in each of the first edge rail and the second edge rail being a curve:
    a portion of at least one aperture disposed within each of the first edge rail and the second edge rail;
    a gimbal coupled to the first end; and
    a read/write head coupled to the gimbal.

14. The apparatus of claim 13 wherein the at least one aperture is rectangular.

15. The apparatus of claim 13 wherein the at least one aperture is slanted at an angle.

16. The apparatus of claim 13 wherein the at least one aperture comprises two apertures.

17. The apparatus of claim 13 wherein the first edge rail and the second edge rail extend from about the first end to about the second end.

18. The method for operating a disk drive apparatus, the method comprising:
    coupling a read/write head to a load beam;
    applying the read/write head onto a disk to read a selected track of the disk;
    rotating the disk about a fixed axis; and
    wherein the load beam having a first edge rail and a second edge rail for stiffness, the first edge rail and the second edge rail each having both an edge contoured as a curve and at least one aperture.

19. The method of claim 18 wherein a rotational speed of the disk is greater than about 3,000 rpm.

20. The method of claim 18 wherein the disk comprises tracks to store information.

21. The method of claim 18 wherein the disk comprises ferromagnetic material.

22. The method of claim 18 wherein the disk comprises optical material.

* * * * *